United States Patent
Janoušková et al.

(10) Patent No.: US 12,406,478 B2
(45) Date of Patent: Sep. 2, 2025

(54) GENERATING STRONG LABELS FOR EXAMPLES LABELLED WITH WEAK LABELS

(71) Applicant: International Business Machines Corporation, Armonk, NY (US)

(72) Inventors: Klára Janoušková, Prague (CZ); Ioana Giurgiu, Zurich (CH); Mattia Rigotti, Basel (CH); Adelmo Cristiano Innocenza Malossi, Schönenberg (CH)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 18/166,095

(22) Filed: Feb. 8, 2023

(65) Prior Publication Data

US 2024/0265676 A1  Aug. 8, 2024

(51) Int. Cl.
| | |
|---|---|
| *G06V 10/774* | (2022.01) |
| *G06N 3/0895* | (2023.01) |
| *G06V 10/77* | (2022.01) |
| *G06V 10/778* | (2022.01) |
| *G06V 10/82* | (2022.01) |

(52) U.S. Cl.
CPC ......... *G06V 10/774* (2022.01); *G06N 3/0895* (2023.01); *G06V 10/7715* (2022.01); *G06V 10/7788* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 2011/0052063 A1* | 3/2011 | McAuley | ............... | G06V 20/35 |
| | | | | 382/224 |
| 2016/0125274 A1* | 5/2016 | Zhou | ...................... | G06F 18/24 |
| | | | | 382/160 |
| 2017/0262723 A1* | 9/2017 | Kozitsky | ............... | G06V 20/62 |

(Continued)

OTHER PUBLICATIONS

Arachie et al., "A General Framework for Adversarial Label Learning", Journal of Machine Learning Research 22, (2021) 1-33, Submitted May 2020; Revised Apr. 2021, Published Apr. 2021, 33 pages.

(Continued)

*Primary Examiner* — Leon Flores
(74) *Attorney, Agent, or Firm* — Kimberly Zillig

(57) ABSTRACT

A method for generating strong labels for examples labelled with weak labels leverages an artificial neural network, or ANN, which is assumed to have been trained on a training set of examples labelled according to weak labels (e.g., classes of structural defects in images of civil engineering structures). The method processes each example of a set of test examples by performing the following operations. The trained ANN is first executed on each example to infer a weak label. Then, the method extracts explanatory features from the ANN as executed on the example. The method generates a strong label (e.g., a region boundary of the structural defect), based on the extracted explanatory features. The method subsequently prompts a user to react to one or each of the inferred weak label and the generated strong label. The response obtained is then interpreted by the method to obtain a further weak label.

20 Claims, 6 Drawing Sheets

(56) References Cited

U.S. PATENT DOCUMENTS

| | | | |
|---|---|---|---|
| 2019/0073568 A1* | 3/2019 | He | G06T 7/001 |
| 2021/0209412 A1 | 7/2021 | Quader | |
| 2021/0272681 A1* | 9/2021 | Zheng | G06T 7/0012 |
| 2022/0253630 A1* | 8/2022 | Shekhar | G06N 7/01 |

OTHER PUBLICATIONS

Branson et al., "Strong Supervision From Weak Annotation: Interactive Training of Deformable Part Models", 2011 International Conference on Computer Vision, Nov. 13, 2011, 8 pages.

Lee et al., "Anti-Adversarially Manipulated Attributions for Weakly and Semi-Supervised Semantic Segmentation", Proceedings of the IEEE/CVF Conference on Computer Vision and Pattern Recognition, 2021, pp. 4071-4080.

Maninis et al., "Deep extreme cut: From extreme points to object segmentation." Proceedings of the IEEE Conference on Computer Vision and Pattern Recognition, 2018, 10 pages.

Ratner et al., "Snorkel: Rapid Training Data Creation with Weak Supervision", Proceedings of the VLDB Endowment, vol. 11, No. 3, arXiv:1711.10160v1 [cs.LG] Nov. 28, 2017, 17 pages.

Varma et al., "Snuba: Automating Weak Supervision to Label Training Data", Proceedings of the VLDB Endowment, Fol. 12, No. 3, ISSN 2150-8097, 2018, DOI: https://doi.org/10.14778/3291264.3291268, 14 pages.

Janouskova et al., "Model-Assisted Labeling via Explainability for Visual Inspection of Civil Infrastructures", Computer Vision for Civil and Infrastructure Engineering (CVCIE @ ECCV2022), Grace Period Disclosure, Oct. 24, 2022, 14 pages.

* cited by examiner

GENERATING STRONG LABELS FOR EXAMPLES LABELLED WITH WEAK LABELS

STATEMENT REGARDING PRIOR DISCLOSURES BY THE INVENTOR OR A JOINT INVENTOR

The following disclosure is submitted under 35 U.S.C. 102(b)(1)(A): DISCLOSURE: JANOUSKOVA et al., "Model-Assisted Labeling via Explainability for Visual Inspection of Civil Infrastructures", Computer Vision for Civil and Infrastructure Engineering (CVCIE@ECCV2022), 24 Oct. 2022, 14 pages.

BACKGROUND

The invention relates in general to computerized techniques (i.e., computer-implemented methods and computer program products) for classification methods for generating strong labels for examples that are labelled with weak labels. In particular, it is directed to methods that extract a class activation map from a classifier, as executed on a given example of image of civil engineering structure, to generate a region boundary of structural defect in the image. The method may further prompt a user to interact with a manual image annotation tool and parse the user interactions to generate further weak labels to accordingly retrain the classifier.

Machine learning often relies on artificial neural networks (ANNs), which are computational models inspired by biological neural networks in human or animal brains. Such systems progressively and autonomously learn tasks by means of examples; they have successfully been applied to technology areas such as speech recognition, text processing and computer vision.

An ANN comprises a set of connected units or nodes, which compare to biological neurons in animal brains and are therefore called artificial neurons. Signals are transmitted along connections (also called edges) between artificial neurons, similarly to synapses. That is, an artificial neuron that receives a signal processes it and then signals connected neurons. Typically, the signals conveyed along such connections are analog real numbers and outputs of the artificial neurons are computed thanks to a non-linear function of the sum of its inputs.

Connection weights (also called synaptic weights) are associated with the connections and nodes; such weights adjust as learning proceeds. Each neuron may have several inputs and a connection weight is attributed to each input (the weight of that specific connection). Such connection weights are learned during a training phase and thereby updated. The learning process is iterative: data cases are presented to the network, typically one at a time, and the weights associated with the input values are adjusted at each time step.

Various types of neural networks are known, starting with feedforward neural networks, such as multilayer perceptrons, deep neural networks and convolutional neural networks. Such neural networks are typically implemented in software. However, neural networks may also be implemented by specialized hardware, such as systems involving resistive processing units (having a crossbar array structure) or optical neuromorphic systems.

SUMMARY

According to a first aspect, the present invention is embodied as a computer-implemented method of generating strong labels for examples labelled with weak labels. The method relies on a machine learning (ML) model, such as an artificial neural network (ANN). The ML model is assumed to have been trained on a training set of examples labelled according to weak labels. The method processes each example of a set of test examples by performing the following operations. The trained ML model is first executed on each example to infer a weak label. Then, the method extracts explanatory features from the ML model as executed on the example. Explanatory features are features that have contributed to infer the weak label. The explanatory features can for instance be extracted as an activation map from outputs of an internal neural layer of the executed ML model. The extraction is achieved thanks to an extraction process based on an explainability method, e.g. technique. Next, the method generates a strong label (e.g., a region boundary of a structural defect seen in a civil engineering structure image), based on the extracted explanatory features.

The method subsequently prompts a user (e.g., a subject matter expert) to react to one or of each of the inferred weak label and the generated strong label, typically via a graphical user interface (GUI). The response obtained is then interpreted by the method to obtain a further weak label.

This way, the ML model may advantageously be later re-trained based on the further weak labels obtained for all of the test examples, something that will improve the strong labels subsequently generated, it being noted that the above steps are typically iterated. The ML model is preferably trained and re-trained according to a weak supervision learning scheme.

Another aspect of the invention concerns a method that specifically aims at identifying structural defects in images of materials, such as images of surfaces of such materials or characterization images as obtained with microscopy techniques. This method relies on an ANN. The ANN is configured as a classifier, which is assumed to have been suitably trained, using a training set of examples of images of materials. In this case, the examples are labelled with weak labels that correspond to classes of structural defects that are present in at least some of the images. The method processes each example of a set of test examples by: (i) executing the trained classifier on each example to infer a weak label, which corresponds to a class of structural defect; (ii) extracting a class activation map from outputs of an internal neural layer of the executed classifier; and (iii) generating a strong label, which includes a region boundary of a structural defect in each example. The strong label is generated from a segmentation mask, which is itself obtained from the extracted class activation map.

The user is then prompted to interact with a GUI of a manual image annotation tool to provide feedback on one or each of the inferred weak label and the generated strong label. The user interactions can be parsed to obtain at least one further weak label for each example. In turn, the ANN can be re-trained based on the test examples as labelled with the further weak labels.

According to a final aspect, the invention is embodied as a computer program product, which comprises a computer-readable storage medium having computer-readable program code embodied therewith. The computer-readable program code can be evoked by processing means to cause the latter to perform the steps of any of the above methods.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings.

Figure 1:
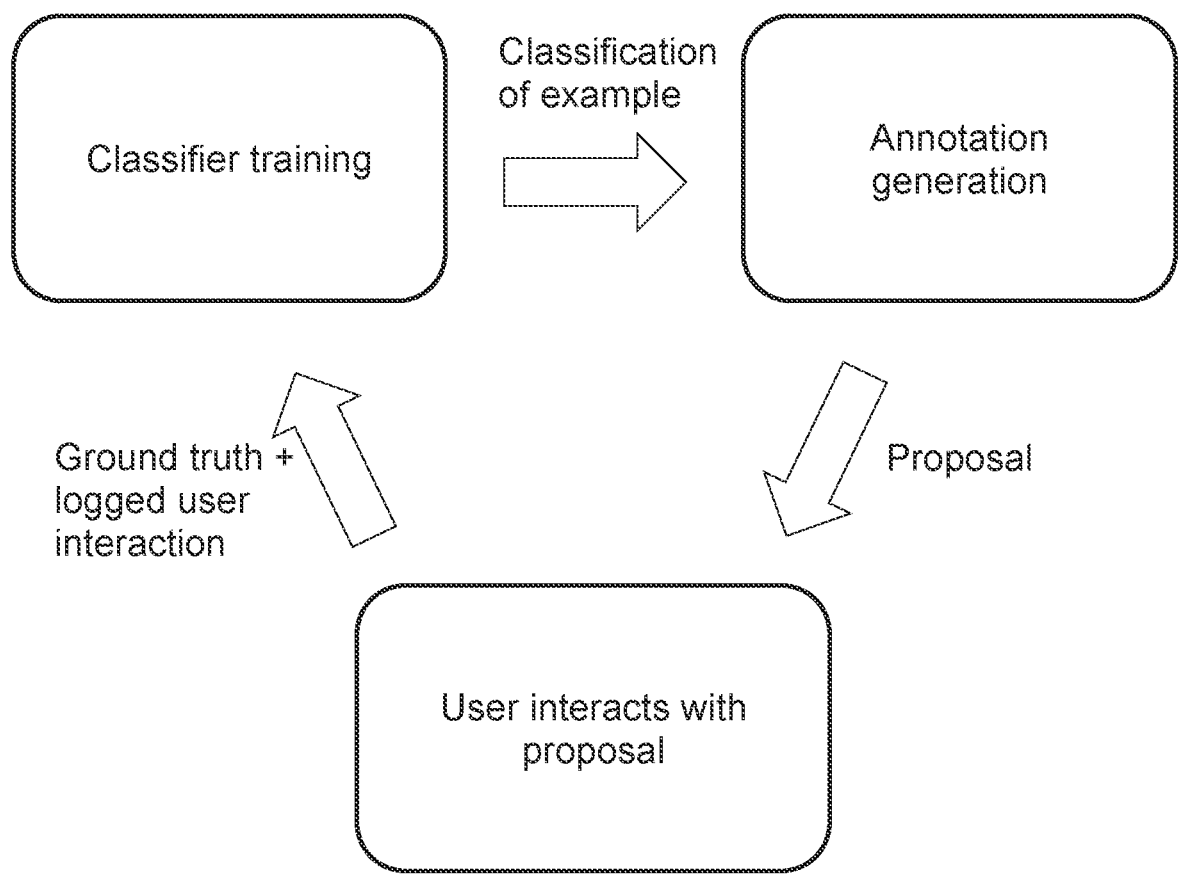
FIG. 1 is a diagram schematically illustrating three main phases of a method of generating strong labels for examples labelled with weak labels, according to preferred embodiments.

Similar or functionally similar elements in the figures have been allocated the same numeral references, unless otherwise indicated. Note, the images shown in FIGS. 2A, 2B, 3A-3C, 4A, 4C, and 4D, are purposely segmented to cope with requirements of some patent offices in terms of drawings. However, the reader should keep in mind that the present methods may typically rely on real-world images, such as high-resolution photographs.

Computerized methods and computer program products embodying the present invention will now be described, by way of non-limiting examples.

DETAILED DESCRIPTION OF EMBODIMENTS OF THE INVENTION

The machine learning revolution is fueled by data. Ideally, the data should be devoid of bias, in order not to mislead the training of cognitive models. Useful applications of these models often require labeled data. Now, maintaining or creating high-quality labels is often a significant obstacle to real-world applications of such models.

For example, the detection and characterization of defects in civil engineering structures often require annotating images, e.g., with carefully drawn region boundaries of structural defects seen in the images. However, obtaining high-quality annotations is time-intensive and, thus costly, it being noted that such tasks are normally performed by subject matter experts (SMEs).

One possibility to address this issue is to rely on weak supervision techniques, which use data sources to provide supervision signal for labeling the training data in a supervised learning setting. Such techniques alleviate the burden of obtaining hand-labeled data sets. However, in practice, the weak supervision solutions proposed so far do only partly optimize the time spent by SMEs to label the data.

The following description is structured as follows. General embodiments and high-level variants are described in section 1. Section 2 addresses particularly preferred embodiments. Section 3 concerns technical implementation details. Note, the main methods disclosed herein and their variants are collectively referred to as the "present methods". All references Sn refer to methods steps of the flowcharts of FIG. 5, while numeral references pertain to devices, components, and concepts, involved in embodiments of the present invention.

1. General Embodiments and High-Level Variants

A first aspect of the invention is now described in detail, in reference to FIGS. 1-5. This aspect concerns a first computer-implemented method of generating strong labels for examples labelled with weak labels. Such a method can be implemented by a computerized system such as depicted in FIG. 6.

The method relies on a machine learning (ML) model, which preferably is an artificial neural network (ANN), such as a convolutional neural network (CNN). However, the present methods may possibly involve other types of ML models, such as support-vector machines (SVMs) and decision trees. The following assumes that the ML model used is an ANN, for the sake of illustration.

The ANN preferably implements a multiclass classifier, which may possibly be a multi-label classifier too. The ANN is assumed to have already been trained (step S10 in the flow of FIG. 5) on a training set of examples 21, 22. Such examples may notably be images of civil engineering structures, as assumed in FIGS. 2A and 2B. The training examples are assumed to be labelled with weak labels, to allow the initial training S10 of the cognitive model. In other words, each training example is assumed to be labelled with at least one label.

Figure 5:
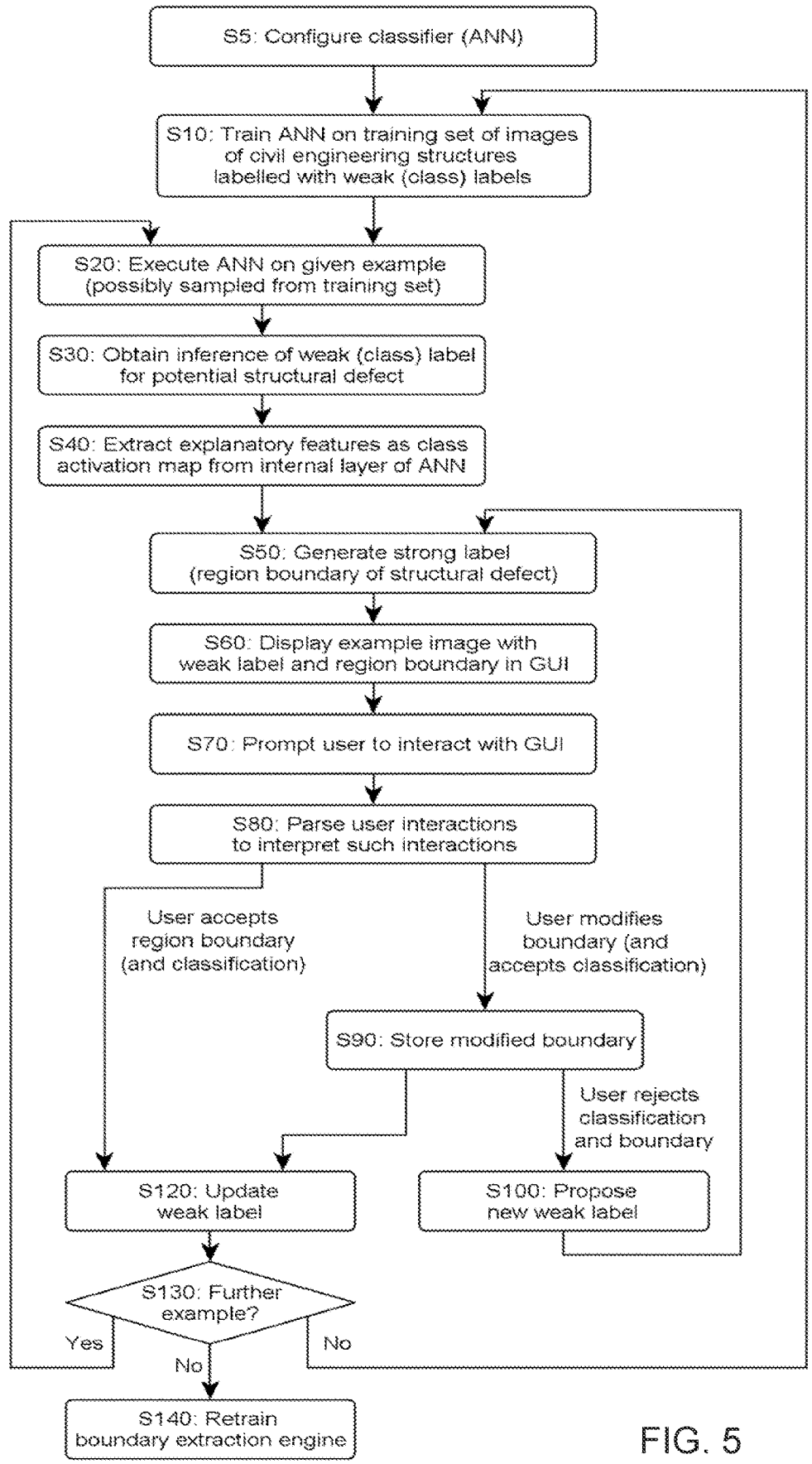
FIG. 5 is a flowchart illustrating high-level steps of a method of identifying structural defects in images of civil engineering structures, as in preferred embodiments.
Figure 6:
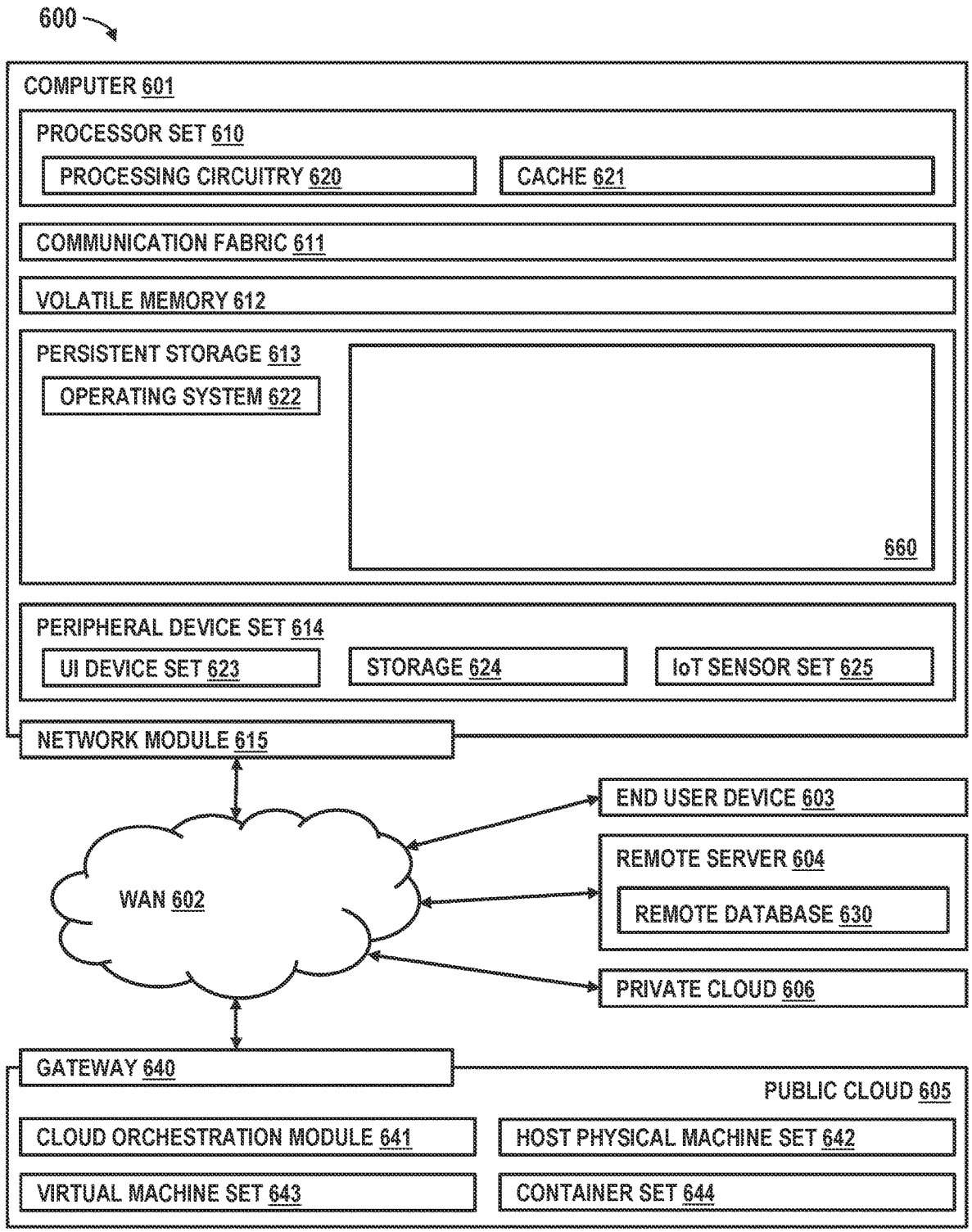
FIG. 6 schematically represents a computerized system, configured to implement the flows of FIGS. 1 and 5, as in embodiments of the invention.

The method requires processing a set of test examples 31, via the following steps (corresponding to steps S20-S50 in the flow of FIG. 5). These steps are performed for each example 31 of the test set. Such examples may be previously unseen examples. They may also be sampled from the training set, for reasons that will become apparent later.

First, the trained ANN is executed (step S20) on each example 31 of the test set. In other words, each test example is fed as input to the ANN for it to execute and thereby infer S30 a weak label, such as a class of structural defects. Next, explanatory features 32 are directly extracted S40 from the executed ANN, using an extraction process based on an explainability method or technique. In at least some embodiments, the extracted features correspond to features that have particularly contributed to infer the weak label. Extracting such features assumes that it is possible to access to internal layers of the model, as of after its execution, so as for the extraction process to be able to leverage internal neural layer output values. Such features may for instance be extracted as a class activation map, from outputs of an internal layer of the ANN, as discussed later in detail. Eventually, a strong label 33, 43 is generated S50 based on the extracted explanatory features 32. Where the processed examples are images, the strong labels may for example be annotations in the form of region boundaries, as in applications discussed later.

A human user (e.g., a subject matter expert, or SME) is subsequently prompted to react to the inferred weak label and/or the generated strong label. This, in practice, is typically achieved through a graphical user interface (GUI). The aim is to obtain a human response, which is then interpreted by the method to generate a further weak label for each example. Thus, further weak labels are obtained for all of the test examples.

This way, the ANN may advantageously be later re-trained, based on the further weak labels obtained for all of the test examples. This, in turn, makes it possible to improve the strong labels that are subsequently generated, it being noted that the above steps are typically iterated. That is, the steps of processing the examples, prompting the user to react, and interpreting the answer, are preferably iterated, so as to gradually improve the generation of strong labels.

Note, the test examples may possibly be sampled from the training set. In this case, the initial weak labels (as initially used for the training) may advantageously be replaced by the further weak labels obtained during subsequent iterations. Alternatively, the test examples may be previously unseen examples. There, the labels generated through user interactions can be used to enrich the training set. In all cases, the ANN can be trained and re-trained according to a weak supervision learning scheme. Multiple labels can possibly be generated, by interpreting the user responses.

Strong labels are labels that are, in practice, more difficult, and therefore more time-intensive, to obtain by users than the weak labels. Thus, the concept of weak vs. strong labels is relative. For example, a class label can be inferred for certain structural defects (e.g., crack, rust, or spalling) as routinely seen in civil engineering structures such as concrete bridges. Now, such class labels are weaker than, e.g., bounding boxes or a region boundaries (i.e., region contours of the corresponding structural defects). And a mere bounding box is itself weaker than a region boundary. Thus, the three above examples of labels already define three possible pairs of (weak vs. strong) labels, namely: classification labels vs. bounding boxes, classification labels vs. region boundaries, or bounding boxes vs. region boundaries. Preferred embodiments rely on classification labels vs. region boundaries, as discussed later in detail.

More generally, the present invention can be applied to various other examples of pairs of weak and strong labels. For example, when applied to images, another example of pair of labels are apices vs. contours of polygonal shapes. When applied to audio files, examples of weak labels can be speech or music, whereas stronger labels may be jazz, rock, blues, etc. When applied to natural language processing, a weak label can for example denote a press article, scientific paper, or book, whereas a corresponding strong label can be a sentence, verb phrase, verb, noon, adjective, determiner, etc. In general, there is a hierarchical relationship between a weak label and a strong label, whereby the strong label is often more specific or precise and, therefore, more time-consuming to produce and evaluate by a user such as an SME.

A key problem is to have SMEs directly label a large amount of data, which is expensive, all the more so when the annotations concern fine structural details, such as region boundaries of structural defects. For instance, SMEs typically need a few seconds to draw a coarse region boundary of a structural defect. Conversely, drawing a precise region boundary may take minutes, even when using a dedicated manual image annotation tool (MIAT). Thus, it is desired to devise a method that makes it possible to take full advantage of the time that SMEs spend on annotation platforms. Such labor can be substantially decreased by directly generating S50 the strong labels and by leveraging the executed ANN itself, i.e., as executed S20 on each particular example to infer S30 a weak label. The strong labels are thus automatically formulated, e.g., by leveraging outputs from an internal neural layer of the ANN. Such an approach does not require any data programming from the SMEs. In at least some embodiments, users do not have to explicitly provide labeling functions to obtain labels and such functions/labels do not need to be combined to obtain the strong labels.

In the present context, however, human users still provide feedback, e.g., using an annotation tool, albeit a posteriori, i.e., based on propositions made by the tool. There, additional acceleration can be achieved by automatically parsing user interactions with the annotation tool to update the weak labels and accordingly re-retrain the cognitive model. This, in turn, further improves the generation of strong labels.

The following paragraphs describe preferred embodiments of the extraction process used to generate the strong labels. As said, the extraction process is based on an explainability method. This process is run to identify explanatory features (for each example) that have contributed to the weak label inferred by the trained ANN. Such explanatory features can for instance be extracted in the form of an activation map, e.g., as a class activation map, should the ANN implement a classifier, as in preferred embodiments. The strong labels 33, 43 are subsequently generated based on the extracted explanatory features. The strong label can for instance include annotation proposals, e.g., in the form of boundaries (such as bounding boxes or region boundaries) of a given image feature, e.g., a structural defect in a microscopy image such as an X-ray characterization image of a given crystalline material or an image of a civil engineering structure.

Note, the present methods typically rely on 2D images. However, the same approach can, in principle, be applied to 3D images, such as 3D images related to anatomical entities of the human body. In that case, the region boundaries may typically be 3D surfaces.

In general, explainability methods are based on feature attribution methods. In the present context, various explainability methods can be relied on, such as methods based on Class Activation Mapping (CAM) and related methods, e.g., Gradient-weighted Class Activation Mapping (Grad-CAM) and Score-Weighted Visual Explanations for Convolutional Neural Networks (Score-CAM). Other explainability methods may potentially be exploited, such as the Local Interpretable Model-Agnostic Explanations (LIME), SHapley Additive exPlanations (SHAP), Deep Learning Important Features (DeepLIFT), Layer-wise relevance propagation (LRP), Contrastive Explanations Method (CEM), etc. All of the above methods are known per se. However, the applicability of some of the above methods may be limited to certain domains and/or for certain types of data. In addition, some of these methods may require adaptations.

The extraction process will preferably exploit outputs from one or more internal layers of the ANN, as executed on a given example. In at least some embodiments, neurons of one or more internal (hidden) neural layers produce values, which can be exploited to form the explanatory features. In fact, suitable explanatory features 32 can be extracted S40 from outputs of a single internal neural layer of the executed ANN, i.e., a layer downstream of the final inference layers (e.g., the classification layers).

This is notably the case where the explanatory features 32 are extracted S40 as an activation map 32 (also called feature map), from an internal layer of the ANN as executed on a particular test example. In at least some embodiments, the outputs of one filter layer (itself applied to a previous layer) of the ANN are used as inputs to the extraction process to derive explanatory features, which, in turn, are used to obtain the strong labels.

Note, steps S20 and S50 can possibly be executed concomitantly, and not necessarily one after the other. That is, steps S20 and S50 may be intermingled, contrary to what the flow of FIG. 5 suggests. For example, the same neural outputs of a given internal layer (e.g., a filter layer) of the ANN may on the one hand, be fed to an inference layer of this ANN, for it to infer S20 the weak label and, on the other hand, be used by the extraction process S50 for it to generate the explanatory features.

The ANN (e.g., a CNN) is preferably configured as a classifier, e.g., inferring a class label for each test example. In that case, the weak labels correspond to classes assigned in accordance with example features that are present (or not) in the examples on which the classifier executes. Assume now that the test and training examples are images (or image portions) of surfaces of materials (such as materials used in civil engineering structures), as in FIGS. 2A-4D. The images considered may involve several types of structural defects, such as defects related to cracking, spalling, delamination, and rust. Correspondingly, the classifier may be trained to identify corresponding classes of defects, respectively corresponding to the several types of structural defects. Of course, an additional class may correspond to the absence of defect, should an input image be free of any structural defect. Similarly, during the inference phase, some (but not all) the examples fed to the classifier may show structural defects, whereas other examples may not. The above example assumes the use of a multiclass classifier. Other applications, however, may only require a binary classifier. In both cases, the classifier may possibly be a multi-label classifier, configured to output additional labels (e.g., related to attributes of defects corresponding to the inferred classes, such as net-crack or a crack with precipitation (for cracks). Other attributes could for instance correspond to dimensions, severity, etc.)

Figure 2A:
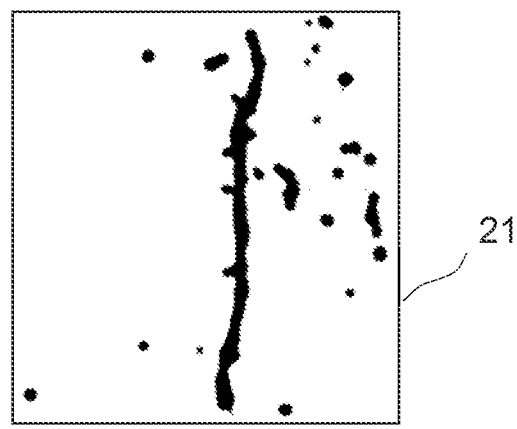
FIGS. 2A and 2B show examples of images (purposely segmented) of civil engineering structures (concrete structure), which can be used to train a classifier, as in embodiments. A structural defect can be seen in FIG. 2A, whereas the image shown in FIG. 2B is free of structural defects.
Figure 2B:
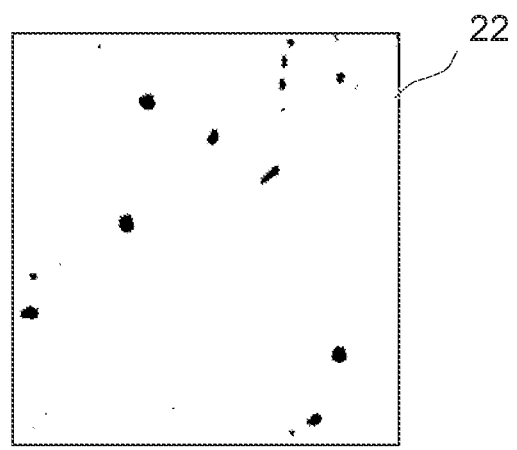
Figure 3A:
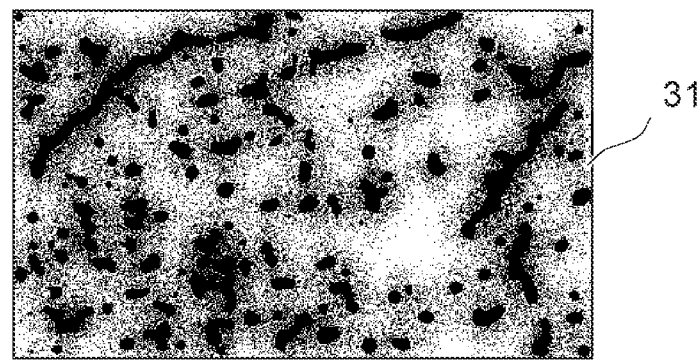
FIG. 3A is another example of image (purposely segmented) of a civil engineering structure, meant to be used for inference purpose, as in embodiments. I.e., this image is fed as input to a classifier (implemented by an artificial neural network, or ANN), which is executed to infer a class label (weak label) in respect of a structural defect seen in the image, as in embodiments.
Figure 3B:
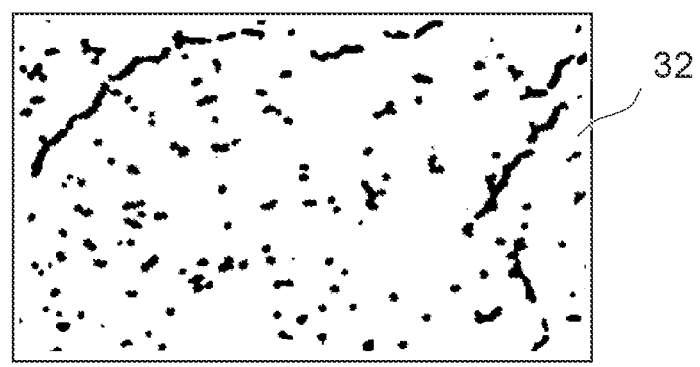
FIG. 3B shows a corresponding class activation map, as extracted from outputs of an internal neural layer of the ANN as executed on the image of FIG. 3A, with a view to generating region boundaries (strong label) of the structural defect, as involved in embodiments.

When using a classifier, the explainability method may be based on a class activation mapping method. In at least some embodiments, the explanatory features are extracted in the form of a class activation map 32, as illustrated in FIG. 3B. Like FIGS. 2A and 2B, FIGS. 3A-3C assume that the input data consist of 2D images of portions of civil engineering structures, where the relevant image features are structural defects. FIGS. 2A and 2B are examples of image portions used to initially train S10 the classifier. Some images, like FIG. 2B, are free of structural defects, whereas other images show structural defects, like FIG. 2A. During the subsequent inference phase, a further image 31 (such as shown FIG. 3A) is fed to the classifier for it to infer a weak label (e.g., "crack") for the input image 31, in which a structural defect is visible. The corresponding class activation map 32 is shown in FIG. 3B. An activation map (also called feature map) refers to a mapping that corresponds to the activation of different parts of the example image. A high activation means that a certain feature was found. In other words, a class activation map emphasizes the regions that are relevant to the inferred class.

To be able to create a CAM map, the network architecture may require a global average pooling layer after the final convolutional layer, and then a linear dense layer. So, in order to create a heatmap for a given class, one may thus take the output images (i.e., feature maps corresponding to different channels) from the last convolutional layer, multiply them by the relevant weights (different weights for each class), and sum or average. Note, the CAM may possibly be processed using an anti-adversarial refinement. In other variants, a grad-CAM approach can be used, should the ANN (in fact a CNN) be configured so as to include several linear layers, in output of the final convolutional layer. More generally, any type of feature attribution map may be relied on, as long as this map explains the weak label obtained.

Figure 3C:
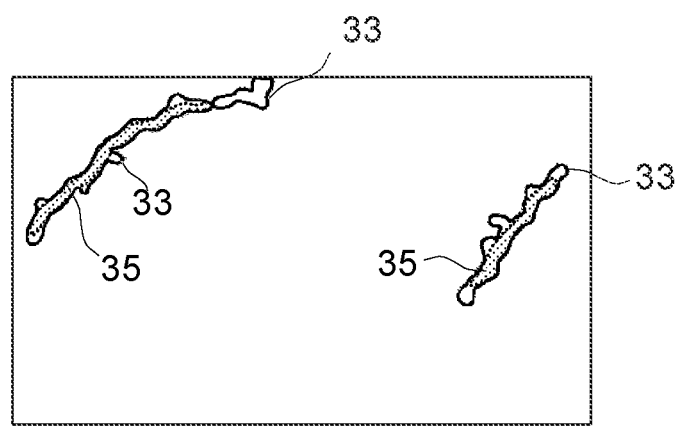
FIG. 3C illustrates region boundaries as generated by an extraction process, as in embodiments. The generated boundaries are depicted as full-line contours. The ground truth, as estimated by a subject-matter expert, is overlaid (dotted contours, patterned fill), for comparison purposes.

The strong labels may for instance include (or consist of) region boundaries 33 of the image features of interest, e.g., structural defects. Such region boundaries are preferably generated S50 through an image segmentation process, which is designed to obtain a segmentation mask from the class activation map 32. Thus, the region boundaries can be drawn as contours of the segmented defect, i.e., the segmented mask. Various filters may be applied, if necessary, during pre-processing or post-processing steps. Note, instead of displaying a region boundary, the GUI may display the segmentation mask itself, it being noted that this mask is delimited by a boundary. In FIG. 3C, the human-estimated boundaries 35 of the defects (i.e., as corrected by the SME), are overlaid on the image. Again, the images shown in FIGS. 2A, 2B, 3A-3C, 4A, 4C, and 4D are purposely segmented for depiction purposes. The reader should keep in mind that the present methods typically work on digital photographs.

Another appealing feature of the present approach is the possibility to leverage user interactions to update weak labels. That is, the processing S20-S120 of each example 31, 40 may advantageously include steps to update or validate weak labels for all of the test examples. For example, in FIGS. 4A-4D, the processed examples are assumed to be images (or, in fact image portions) of civil engineering structures. A MIAT is used to trigger interactions with a user, who is assumed to be an SME. The MIAT displays a GUI (see FIG. 4B), which prompts S70 the SME to react to displayed information. The displayed information may notably include a current example 40 (e.g., an image portion depicting a spalling defect), as well as the weak label 41 ("spalling") inferred S20 for this example, and the correspondingly generated strong label 43, e.g., a region boundary of the identified structural defect.

The aim is to obtain a user response, which is then interpreted S80, with a view to obtaining S120 a further weak label for this example 40. However, rather than explicitly formulating a response, the SME may actually interact with the GUI. The underlying algorithm parses S80 the user interactions, with a view to obtaining S120 a further weak label. In particular, the GUI may prompt S70 the SME to decide whether to accept or reject the weak label inferred, and, if necessary, modify the generated strong label 43. That is, the SME may possibly be given the possibility to explicitly accept or reject a weak label and/or the correspondingly generated S50 defect boundaries. However, the weak label (e.g., "Spalling" in FIGS. 4A-4D) may also be deemed to be implicitly accepted if the SME modifies the generated boundaries. The defect boundaries may for instance be captured as a 2D path, by way of Bézier curves, which the SME can then modify by moving the corresponding control points (e.g., by clicking on them and dragging them), as routinely implemented in image editors. The MIAT may subsequently store S90 the modified boundary 45, if any.

Figure 4A:
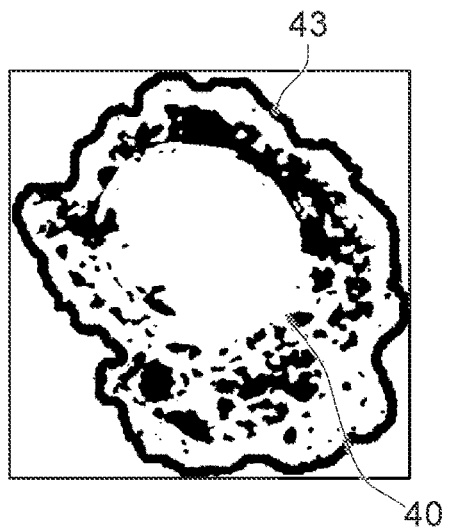
FIG. 4A shows region boundaries generated by the extraction process for another type of structural defect, as in embodiments. The generated boundaries are overlaid on a segmented image of the defect.
Figure 4B:
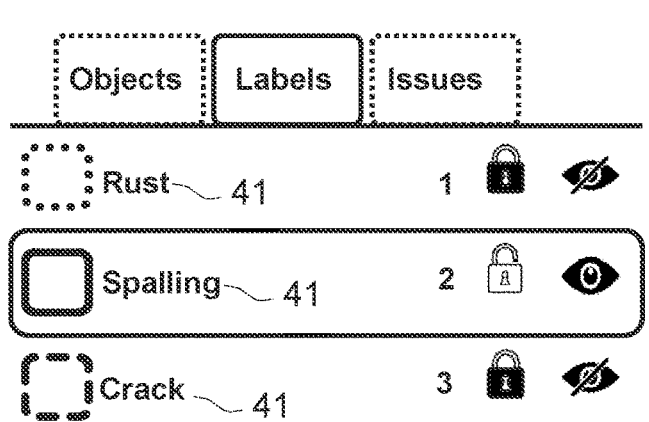
FIG. 4B shows a simplified view of a graphical user interface (GUI), which notably displays a class label inferred by the classifier in respect of the defect shown in FIG. 4A, where the GUI allows the user to manually modify the region boundaries, as in embodiments.
Figure 4C:
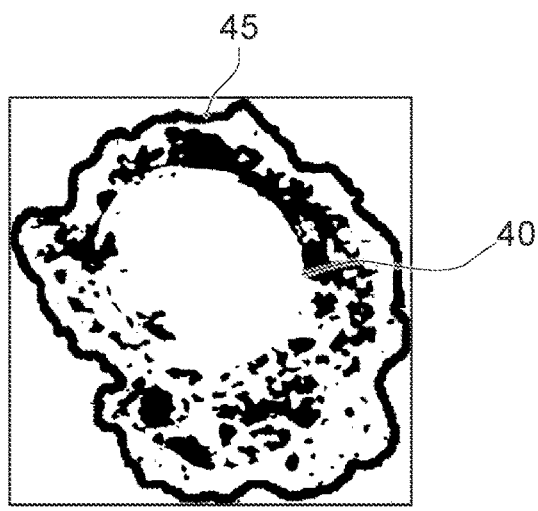
FIG. 4C shows the region boundaries, once manually modified by a user, starting from the region boundaries as initially generated by the extraction process, as involved in embodiments.
Figure 4D:
FIG. 4D shows region boundaries of the same defect as manually drawn by a user, ab initio, i.e., independently from region boundaries generated by the extraction process, for comparison purposes.

FIG. 4C depicts actual contours 45 of a defect boundary, as modified by the SME based on the boundary as initially generated S50 by the extraction process. Comparing FIGS. 4A and 4C shows that little correction is required from the SME. The contours can be corrected in a matter of seconds, whereas drawing a structural defect boundary 46 from scratch can typically take minutes to complete. FIG. 4D shows a contour independently drawn, from scratch, for the same defect 40 by another SME.

Note, if the SME rejects the weak label inferred, the MIAT may possibly propose S100 a new weak label, e.g., by pulling the next label from the classifier, in accordance with the associated class probability. This will give rise to further user interactions, which can again be parsed S80 by the MIAT. On this occasion, the extraction process may propose a new segmentation mask, e.g., by modifying the extracted CAM in accordance with the relevant class, which the SME may then modify.

In variants, the MIAT further prompts the SME to add additional data, such as additional labels or data related to the certainty about the weak and strong labels, it being reminded that the classifier may be configured as a multi-class, multi-label classifier.

In all cases, the user interactions can advantageously be captured by a weak supervision mechanism (i.e., a weakly supervised learning scheme), which may cause to update (i.e., validate or invalidate and then correct) the weak and strong labels generated, or even enrich the labels. Eventually, updated weak labels can be obtained for all of the test examples processed by the method, in addition to strong labels that may be manually corrected by the SME. Thus, the ANN may possibly be re-trained S10 based on the test examples, as labelled with the further weak labels obtained.

As noted previously, the test examples may be examples that are sampled from the training set, in order to validate existing labels. In variants, the test examples can be new examples (previously unseen by the learning algorithm). In all cases, the ANN can eventually be re-trained S10 based on updated labels of existing or new examples, to improve the learning.

As evoked previously, the user interactions enabled by the MIAT may prompt the SME to modify the strong labels. Now, this information may advantageously be capitalized S90 in order to improve S140 the extraction process. Thus, the extraction process may itself be implemented by an additional cognitive algorithm that is independent of the ANN (subject to its inputs), as assumed in FIG. 5. This additional cognitive algorithm can initially be trained (e.g., based on examples of CAMs and classes, as well as expected boundaries), and later re-trained S140 based on corrected boundaries, for example. The two cognitive models do not necessarily need to be re-trained S10, S140 after processing each test examples. Rather, they can be re-trained only after all examples have been processed, e.g., prior to starting each new SME session, for example. In variants, the extraction process may simply rely on a non-cognitive pipeline, which may possibly be updated, if necessary.

Another aspect of the invention specifically concerns a method of identifying structural defects in images of materials, as illustrated above in respect of images of civil engineering structures. More generally, though, the same method may be applied to other types of materials or structures and may also be applied to characterization images such as obtained with microscopy techniques.

The general principle remains the same. The method relies on an ANN, which is be configured as a classifier. The ANN is assumed to have been trained on a training set of examples of images of materials, where the training examples are labelled with weak labels corresponding to classes of structural defects that are present in at least some of the images. Then, each example a set of test examples is processed S20-S120 by executing S20 the trained classifier, on each example, to infer S30 a weak label, which corresponds to a class of structural defect. Again, an additional class may be used to indicate a lack of structural defect, should no defect be detected. Next, a class activation map 32 is extracted S40 from outputs of an internal neural layer (e.g., a filer layer) of the classifier as executed on this example. Then, the method generates S50 a strong label in accordance with the weak label as inferred for this example. The strong label includes or consists of a region boundary of a structural defect (if any), as contained in the example. As explained earlier, the region boundary can notably be generated from a segmentation mask obtained from the extracted class activation map.

Next, the method prompts S70 a user (e.g., an SME) to interact with the GUI of a MIAT. E.g., the GUI displays information related to a current example and then allows the SME to interact with the GUI in respect of the inferred weak label and/or the generated strong label. The resulting user interactions are parsed S80 by a parsing algorithm, e.g., running as background task, with a view to obtaining S120 at least one further weak label for the current example. Eventually, further weak labels are obtained for various test examples, such that the ANN can later be re-trained S10 based on the further test examples as labelled with the further weak labels, something that allows the generated strong labels to improve over time. Again, the ANN is preferably (re-)trained according to a weak supervision learning scheme.

Steps S30 and S40 can be performed for whole images or image portions (i.e., partitioned images) only. That is, the examples considered may originate from distinct images. In variants, or in addition, these examples are obtained by partitioning one or more initial (large) images that may possibly contain several features of interest. For example, a large initial image can be partitioned into several image portions, which may further be cropped and further processed, to form adequate test examples. Note, the partitioning step may possibly be performed as a pre-processing step or as part of the cognitive model. In other words, the classifier can be configured to first partition images, thanks to methods known per se, and then train on the resulting image portions. On inferencing, the classifier can first partition test images, and produce weak labels for each image portion of interest, with a view to generating strong labels for each of these portions.

FIG. 5 shows a possible flow of operations. The ANN is initially configured as a classifier at step S5. It is initially trained at step S10, e.g., on a training set of images of civil engineering structures, where images are labelled with weak (class) labels. At step S20, the ANN is executed on a given test example, to obtain S30 an inference result, i.e., a weak (class) label for a potential structural defect, should such a defect be detected in the current image. At step S40, explanatory features are extracted, e.g., as a class activation map, from outputs of an internal layer of the ANN, as executed on the current example. A strong label (i.e., a region boundary of the structural defect) is subsequently generated S50. Next, the GUI of the MIAT displays S60 the current image (or a portion thereof), together with a weak label and the region boundary of the detected effect. The GUI then prompts S70 the user to interact with the displayed information. This generates user interactions, which are parsed S80 so as to generate new weak labels, which can be used to update the initial labels. In at least some embodiments, the new weak labels are substituted to or added to the initial labels. If the user accepts both the classification and the region boundary proposed, the previous weak labels are validated. Else, the user may directly modify the boundary (yet implicitly accept the proposed classification). In this case, the MIAT will store S90 the modified boundary, something that may be used to retrain S140 the boundary extraction engine. Another scenario is one in which the user rejects the classification (and the proposed boundary), in which case the MIAT may propose a new weak label, based on which a new boundary is generated S50 in accordance with the new defect class. And this may trigger new user interactions. In all cases, weak labels are eventually updated S120. The process repeats for each example of the test set considered (S130: Yes). The ANN may eventually be re-trained S10, once all examples have been processed (S130: No). So does the boundary extraction engine S140.

A final aspect of the invention concerns a computer program product for generating strong labels for examples, which are again assumed to be labelled with weak labels. The computer program product comprises a computer-readable storage medium, which has computer-readable program code embodied therewith. The computer-readable program code is programmed so that it can be evoked by processing means of a computerized system to cause such processing means to implement steps of any of the computer-implemented methods described herein. This final aspect is described in more details in section 3.

The above embodiments have been succinctly described in reference to the accompanying drawings and may accommodate a number of variants. Several combinations of the above features may be contemplated. Examples are given in the next section.

2. Specific Embodiment

The following embodiment aims at easing the generation of high-quality annotations (decrease the manual labor of the human annotator) for different types of structural defects of civil engineering structures.

The proposed approach takes advantage of the time annotators spend on an annotation platform by iterating several phases, see FIG. 1. The ANN implements a classifier, which is initially trained to infer weak labels for examples of images of civil engineering structures, under a weak supervision scheme. On inferencing, the classifier infers a weak label for each example of image of civil engineering structure. Plus, an extraction process is used to generate strong labels, based on the ANN as executed on the current example and the weak label inferred for this example. This extraction process extracts a CAM map from outputs of an internal layer of the executed ANN, based on which a segmentation mask is obtained, to eventually produce region boundaries. Next, the algorithm parses user interactions with a GUI of the annotation platform and interprets them as one or more weak labels. The obtained weak labels can then replace the previous labels of examples already contained in the training dataset, come in addition to such labels, or be used together with the current example, which is added to the training set. Thus, the updated weak labels can be used to re-train the ANN, under the weak supervision scheme.

The above method is iterated, as shown in FIG. 1, thereby eliciting new user interactions that are harvested as weak labels. I.e., the GUI of the annotation tool provides suggestions to the SME, which suggestions can be accepted, rejected, or modified. Such interactions are then interpreted to validate weak labels, and so on. This solution substantially simplifies and, thus, accelerates the annotation labor. As a result, the annotation time requires seconds instead of minutes.

Such a method can advantageously be applied to the task of segmentation of concrete defects (such as cracks, spalling, and rust) on civil engineering structures. In at least some embodiments, the strong labels correspond to segmentation masks (or, equivalently, region boundaries) of the defects, whereas the weak labels are classification labels (e.g., crack, spalling, rust, algae, or no defect).

The annotation tool further crops large images to be labeled. The weakly trained classifier is used to generate a strong annotation proposal, i.e., a region boundary of a segmentation mask, for each defect detected in the large image. Next, the annotator interacts with the proposed annotation mask, and decides whether to accept it, reject it, or modify it. The corrected annotation proposals are stored as new strong annotations, which can be used to re-train the extraction process. In addition, the user interactions are logged to derive weak labels, which favorably impacts the subsequent process of generation of strong labels.

An advantage of this approach is that the annotators do not have to write multiple small programs (for the labeling functions) to generate the labels that are subsequently used to train the ANN. On the contrary, the weak labels are captured from user interactions.

3. Technical Implementation Details

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 shown in FIG. 6 contains an example of an environment for the execution of at least some of the computer code involved in performing the present methods, such as code 660 capturing machine learning algorithms for training and executing the present ANNs and extraction processes. In addition to block 660, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 660, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located off chip.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as the inventive methods). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 660 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 660 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

While the present invention has been described with reference to a limited number of embodiments, variants and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A computer-implemented method of generating strong labels for examples labelled with weak labels, the method comprising:
given a machine learning (ML) model trained on a training set of examples labelled according to one or more previously identified weak labels, processing a set of test examples by:
executing the trained ML model on an example of the set of test examples to infer a weak label,
extracting, from the executed ML model, explanatory features that have contributed to infer the weak label using an extraction process based on an explainability method, and
generating a strong label based on the extracted explanatory features;
prompting, via a graphical user interface, a user to react to one or each of the inferred weak label and the generated strong label, to obtain a human response; and
interpreting the human response to generate a further weak label for the example.

2. The method according to claim 1, wherein:
the trained ML model is an artificial neural network (ANN); and
the explanatory features are extracted from outputs of an internal neural layer of the ANN.

3. The method according to claim 2, wherein the explanatory features are extracted as an activation map.

4. The method according to claim 3, wherein:
the ANN is configured as a classifier;
the weak labels correspond to classes assigned in accordance with example features that are present in at least some of the examples of each of the training set and the test set; and the explainability method is based on a class activation mapping method, whereby said activation map is extracted as a class activation map, in accordance with the inferred weak label.

5. The method according to claim 4, wherein
the examples of the training set and the test set are images, and
the example features are image features.

6. The method according to claim 5, wherein the strong labels include region boundaries of said image features.

7. The method according to claim 6, wherein the region boundaries of the image features are generated through an image segmentation process designed to obtain a segmentation mask based on the extracted activation map.

8. The method according to claim 6, wherein:
the images are images of materials;
the image features consists of several types of structural defects;
the classes correspond to the several types of structural defects; and
the boundaries are region boundaries of the structural defects.

9. The method according to claim 8, wherein:
the images are images of surfaces of civil engineering structures; and
the structural defects relate to two or more selected from the group consisting of:
cracking, spalling, delamination, and rust.

10. The method according to claim 1, wherein at least some of the test examples are examples that are sampled from the training set.

11. The method according to claim 10, wherein:
the examples of the training set and the test set are images;
the graphical user interface is a graphical user interface of a manual image annotation tool;
prompting the user to react to one or each of the inferred weak label and the generated strong label comprises prompting the user to interact with the graphical user interface to modify the generated strong label, whereby the obtained human response includes a modified strong label; and
the method further comprises storing the modified strong label.

12. The method according to claim 11, wherein:
the human response includes user interactions with the graphical user interface, beside the modified strong label; and
interpreting the human response comprises parsing the user interactions to obtain the further weak label.

13. The method according to claim 12, wherein prompting the user to interact with the graphical user interface comprises prompting the user to decide whether to:
accept the modified strong label;
reject the modified strong label; or
modify the generated strong label.

14. The method according to claim 13, wherein the method further comprises refining the extraction process based on the modified strong label.

15. The method according to claim 1, wherein the method further comprises re-training the trained ML model based on the test examples as labelled with the further weak labels.

16. The method according to claim 15, wherein the method further comprises:
training the ML model based on the training set of examples prior to processing each example; and
re-training the ML model according to a supervised learning scheme.

17. A method of identifying structural defects in images of surfaces of materials, wherein the method comprises:
- given an artificial neural network, or ANN, the ANN configured as a classifier trained on a training set of examples of images of materials, the examples labelled with weak labels corresponding to classes of structural defects that are present in at least some of the images, processing a set of test examples by:
  - executing the trained classifier on an example of the set of test examples to infer a weak label, which corresponds to a class of a structural defect,
  - extracting a class activation map from outputs of an internal neural layer of the executed classifier,
  - generating a strong label, which includes a region boundary of a structural defect in the example, from a segmentation mask obtained from the extracted class activation map,
  - prompting a user to interact with a graphical user interface of a manual image annotation tool in respect of one or each of the inferred weak label and the generated strong label to obtain user interactions; and
  - parsing the user interactions to obtain a further weak label for the example.

18. The method according to claim 17, wherein the method further comprises:
- re-training the ANN based on the test examples as labelled with the further weak labels, according to a weak supervision learning scheme.

19. The method according to claim 17, wherein the method further comprises:
- partitioning an initial image into several image portions to form the examples of the test set.

20. A computer program product for generating strong labels for examples labelled with weak labels, the computer program product comprising:
- one or more computer readable storage media and program instructions stored on the one or more computer readable storage media, the program instructions comprising instructions to:
- process, given a machine learning (ML) model trained on a training set of examples labelled according to said weak labels, a set of test examples by:
  - executing the trained ML model on an example of the set of test examples to infer a weak label,
  - extracting, from the executed ML model, explanatory features that have contributed to infer said weak label, thanks to an extraction process based on an explainability method, and
  - generating a strong label based on the extracted explanatory features;
- prompt, via a graphical user interface, a user to react to one or each of the inferred weak label and the generated strong label, to obtain a human response; and
- interpret the human response to generate a further weak label for said each example, so as to obtain further weak labels for all of the test examples.

* * * * *